United States Patent
Kim et al.

(10) Patent No.: US 6,470,135 B1
(45) Date of Patent: Oct. 22, 2002

(54) METHOD AND APPARATUS FOR RECORDING DIGITAL DATA STREAMS

(75) Inventors: Byungjin Kim; Kang-Soo Seo, both of Kyunggi-do; Jea-Yong Yoo; Ki Won Kang, both of Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/435,608

(22) Filed: Nov. 8, 1999

(30) Foreign Application Priority Data

Nov. 8, 1998 (KR) .............................................. 98-48096

(51) Int. Cl.[7] ................................................ H04N 5/91
(52) U.S. Cl. ............................ 386/68; 386/95; 386/125; 386/126
(58) Field of Search ............................ 386/68, 95, 46, 386/98, 111, 124, 125–126, 81, 82, 109, 112, 70; H04N 5/91

(56) References Cited

U.S. PATENT DOCUMENTS

| | | | | |
|---|---|---|---|---|
| 5,740,307 A | * | 4/1998 | Lane .............................. | 386/68 |
| 5,832,085 A | * | 11/1998 | Inoue et al. .................... | 386/131 |
| 5,859,949 A | * | 1/1999 | Yanagihara .................... | 386/68 |
| 6,002,834 A | * | 12/1999 | Hirabayashi et al. .......... | 386/70 |
| 6,061,382 A | * | 1/2000 | Yamagishi et al. ............ | 386/109 |
| 6,028,726 A | * | 2/2000 | Yanagihara .................... | 386/81 |
| 6,065,050 A | * | 5/2000 | DeMoney ....................... | 725/88 |
| 6,115,531 A | * | 9/2000 | Yanagihara .................... | 386/67 |
| 6,229,801 B1 | * | 5/2001 | Anderson et al. ............. | 370/349 |

FOREIGN PATENT DOCUMENTS

| | | |
|---|---|---|
| JP | 7-212768 | 8/1995 |
| JP | 8163496 | 6/1996 |
| JP | 9322111 | 2/1997 |
| JP | 10243352 | 9/1998 |

* cited by examiner

Primary Examiner—Vincent Boccio
(74) Attorney, Agent, or Firm—Birch, Stewart, Kolasch & Birch, LLP

(57) ABSTRACT

A method and apparatus for recording received digital data streams on a recording medium such as a digital video disk and creating and recording management information pertaining to the recorded digital data streams. Random access information contained in the received digital data streams is detected and stream object units are created based upon the detected random access information, which enables reproduction of recorded data to start from the transport stream packet having the random access information and prevents imperfect data reproduction after track seek or time seek operations.

18 Claims, 6 Drawing Sheets

*Conventional Art*

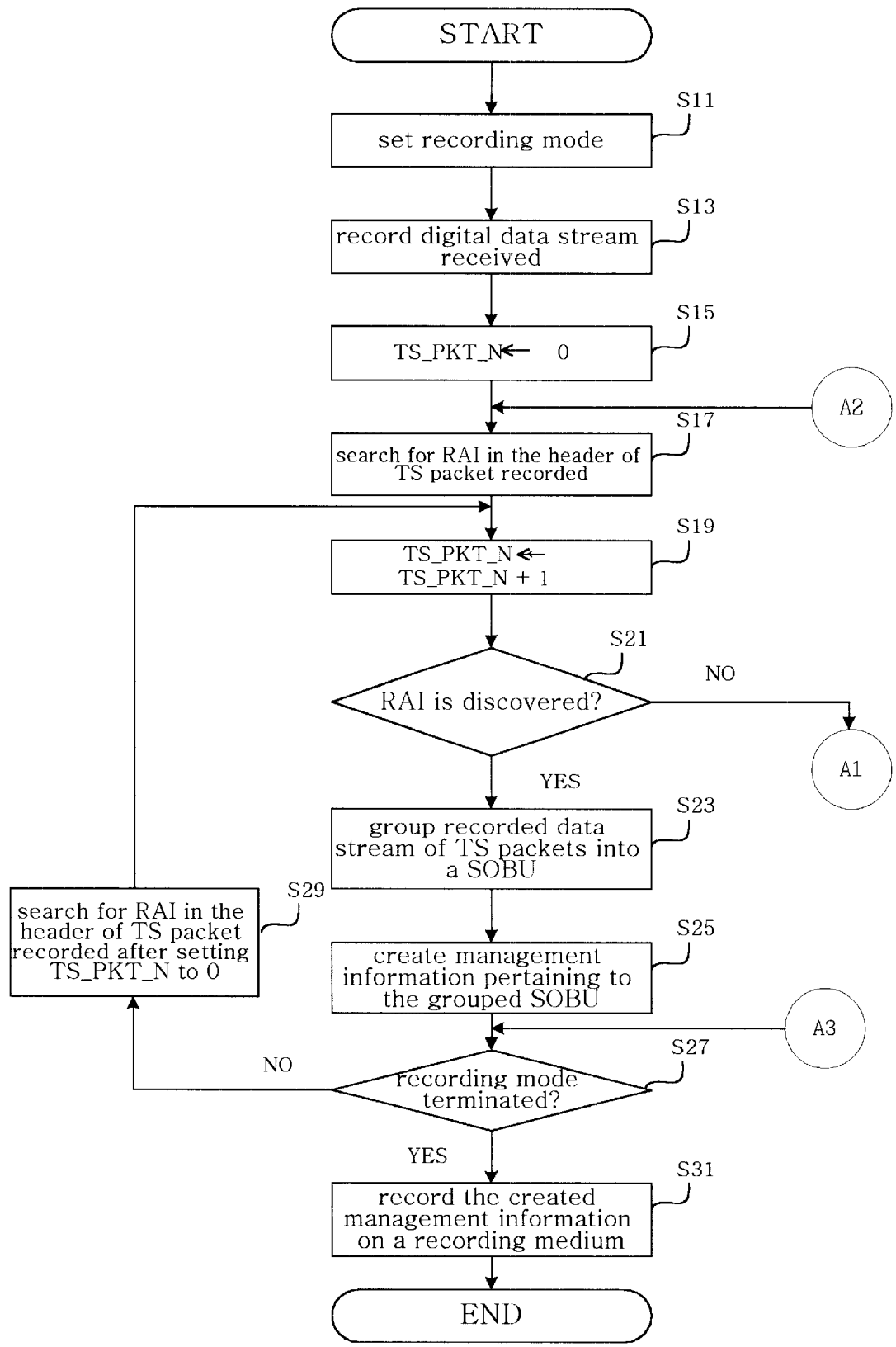

METHOD AND APPARATUS FOR RECORDING DIGITAL DATA STREAMS

BACKGROUND OF THE INVENTION

1. Field of the Invention

The present invention relates to a method and apparatus for recording received digital data streams on a recording medium and creating and recording management information pertaining to the recorded digital data streams.

2. Description of the Related Art

In conventional analog television broadcast, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage median In digital broadcast, a plurality of programs encoded based upon the MPEG format are multiplexed into a transport stream before transmitted. The transmitted transport stream is received by a set top box at the receiver and demultiplexed into a plurality of programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by a set top box can be stored in a streamer such as a digital video disk (DVD) recording apparatus after transmitted through communication interfaces like an IEEE-1394 serial bus. Later, the stored digital data stream can be edited and transmitted back to the set top box so that the stored original digital audio and video data can be presented.

For the above-mentioned systems, it is necessary to develop a method for recording a received digital data stream on a recording medium by partitioning the received data stream into minimum presentation units, each minimum presentation unit being a data decoding unit. Unless the recorded data stream maps to random-accessible minimum presentation units, the initial reproduction of the recorded stream after search operations may be imperfect.

SUMMARY OF THE INVENTION

It is an object of the present invention to provide a method and apparatus that records a received digital data stream by partitioning the received digital data stream into random-accessible data units.

A method for recording digital data streams in accordance with the present invention includes: (a) checking the existence of presentation entry point information for data discrete reproduction in a received digital transport stream of digital transport stream units, the presentation entry point information having been selectively inserted into the digital transport stream; (b) creating and recording information regarding the location of data section based upon the checked result, the data section being separated by the presentation entry point information; and (c) creating and recording indication information for a stream object containing groups of transport stream units, the indication information indicating whether the information regarding the location of data sections separated by the presentation entry point information exists or not.

Another method for recording digital data streams in accordance with the present invention includes: recording a received digital transport stream containing digital transport stream units by grouping the digital transport stream units into stream object units; and creating and recording information indicating whether presentation entry point information for data discrete reproduction is included in the created stream object units or not.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIGS. 4A and 4B are flow diagrams of the method for recording digital data streams according to another embodiment of the present invention.

DETAILED DESCRIPTION OF THE PREFERRED EMBODIMENTS

In order that the invention may be fully understood, preferred embodiments thereof will now be described with reference to the accompanying drawings.

Figure 1:
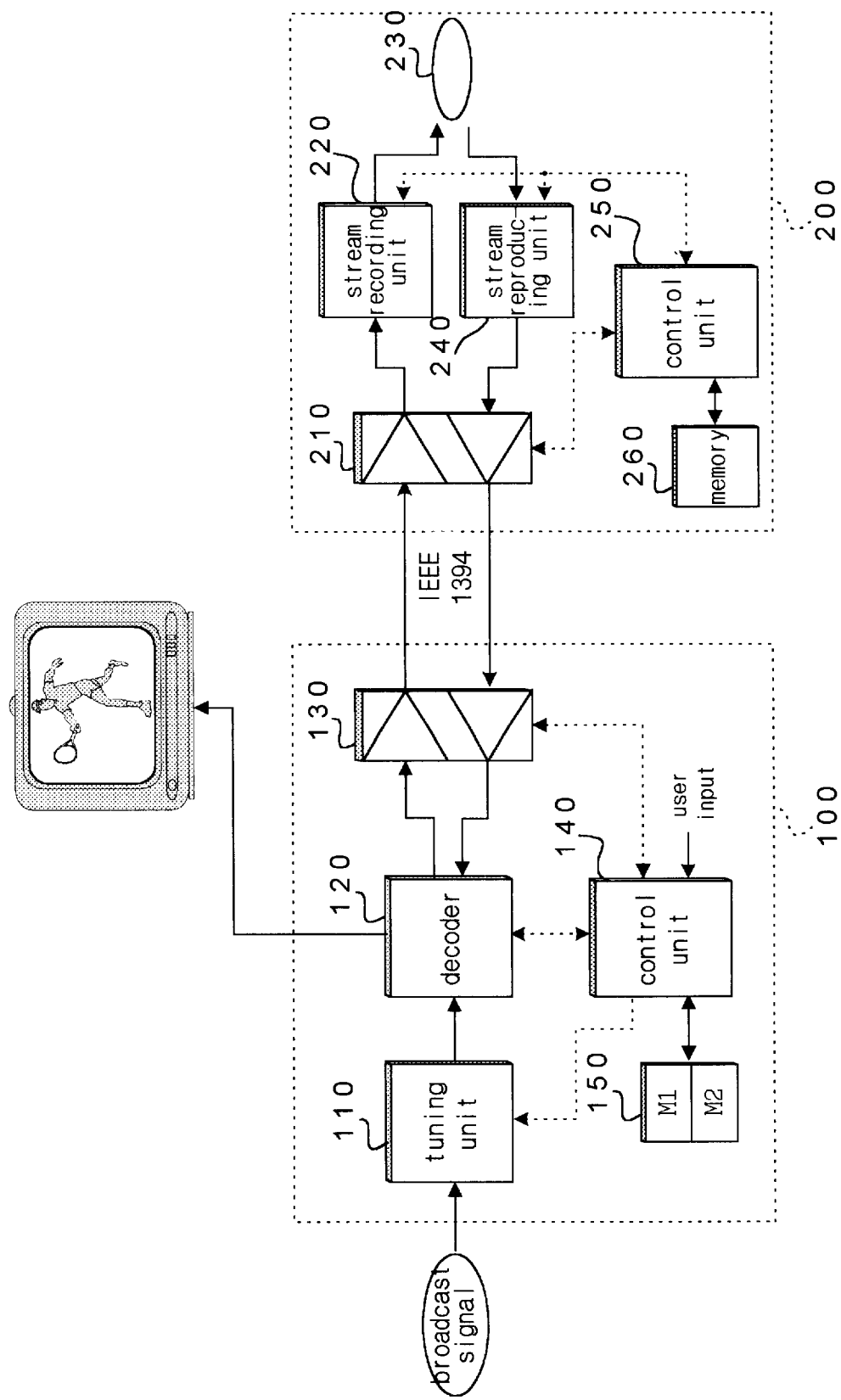
FIG. 1 is a block diagram of an apparatus in which the present invention may be advantageously practiced.

FIG. 1 depicts a block diagram of an apparatus in which the present invention may be advantageously employed. The apparatus includes a set top box 100, a communication interface (IEEE-1394), and a streamer 200.

The set top box 100 receives transport streams encoded by system encoders and transmitted by a plurality of broadcast stations and demultiplexes the received transport streams. After a system decoder 120 decodes the transport stream of a program tuned by a tuning unit 110, a control unit 140 outputs the decoded transport stream to an A/V output device such as a TV set for presentation.

The set top box 100 may transmit a program chosen by a user to the streamer 200 through the IEEE-1394 interface so that the transmitted program is recorded on a recording medium 230 such as a digital video disk by the streamer 200.

In addition, requested by a user, the set top box 100 may receive a program retrieved from the recording medium 230 by the streamer 200 through the IEEE-1394 communication interface so that the received program can be presented on a TV set after being decoded by the decoder 120.

Figure 2:
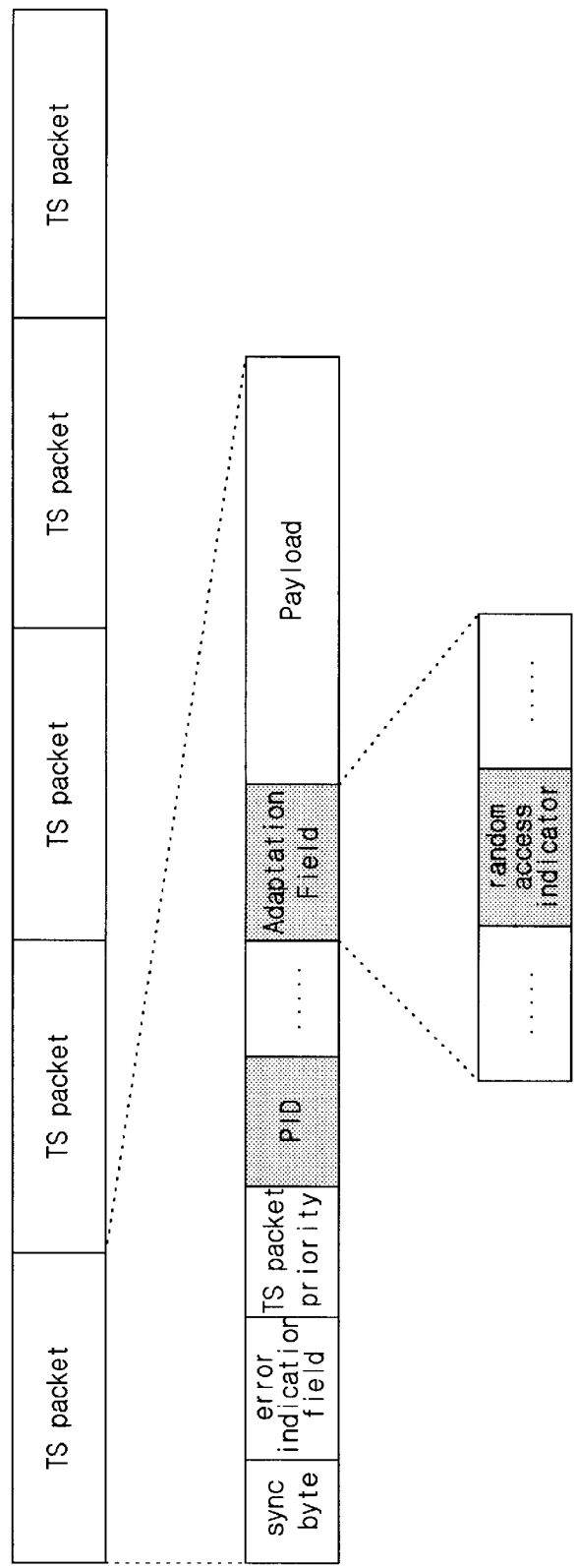
FIG. 2 is a pictorial representation showing the syntax of a digital data stream.

A transport stream packet of a program stream, as shown in FIG. 2, includes a packet header and a payload, the packet header containing fields of a 8-bit sync byte, an error indication field indicative of a possible error of the packet, a PID showing attributes of the data contained in the payload, and an adaptation field. The adaptation field contains various information on the properties of the data stream, such as a random access indicator indicating the start of a video sequence header which is a random access entry point.

Figure 3:
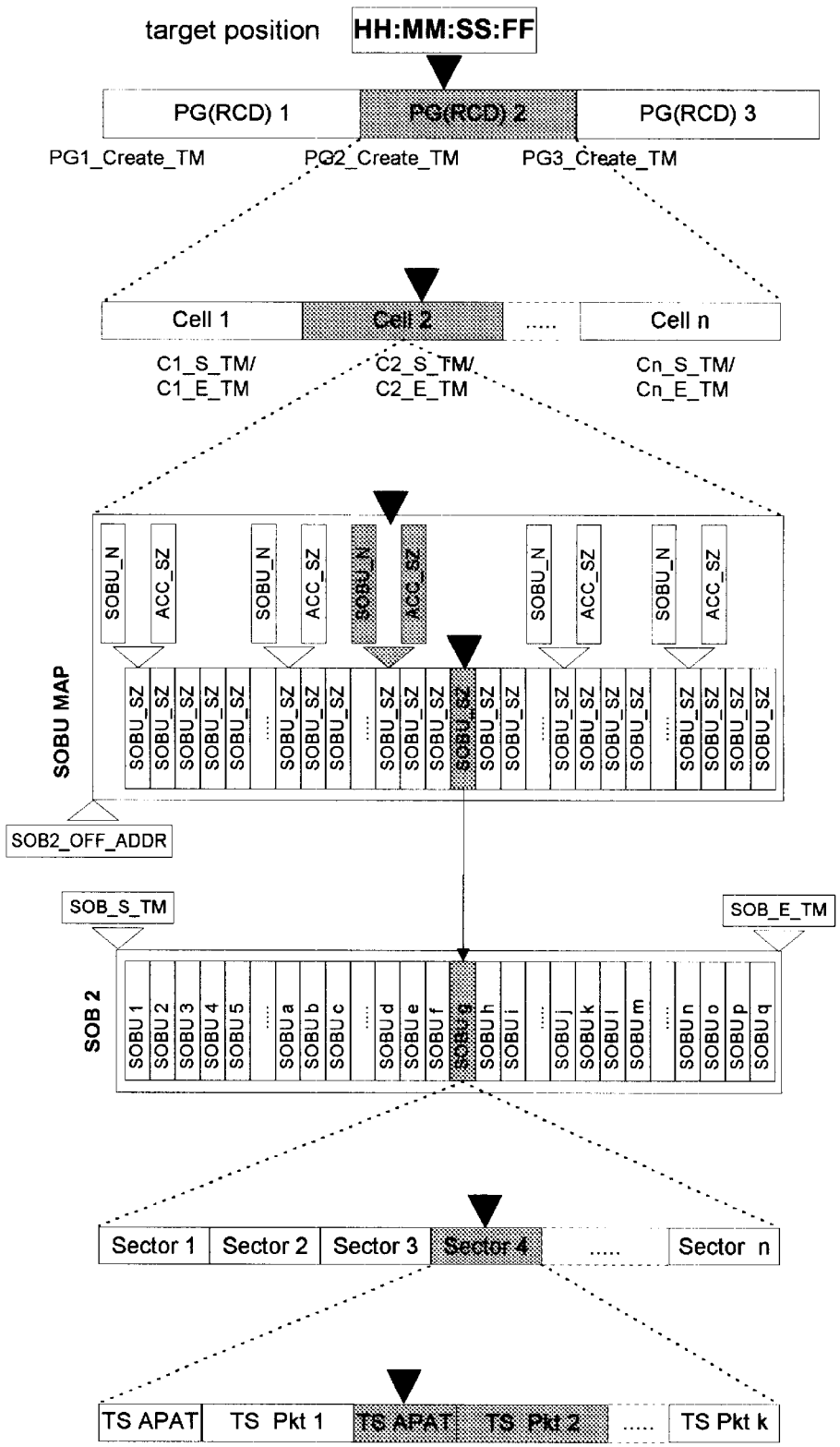
FIG. 3 is a pictorial representation showing the syntax of the recorded data and the management information pertaining to the recorded data created by an embodiment of the present invention.

The method for recording digital data streams in accordance with an embodiment of the present invention will now be described with reference to FIGS. 1 and 3.

If a user's request for recording an incoming data stream tuned by the tuning unit 110 has been received, the control unit 140 of the set top box 100 informs a control unit 250 of the streamer 200 that a recording mode is set and begins to transfer the received digital stream to the streamer 200 through an IEEE-1394 interface. The control unit 250 of the streamer 200 controls a stream recording unit 220 to record the received data stream on the recording medium 230. The transport stream packets (TS Pkt 1~TS Pkt k) constituting the data stream are recorded on the recording medium 230 along with respective transport stream packet arrival times (TS APATs), wherein the transport stream packets with packet arrival times are organized in sectors on the recording medium 230.

Concurrently, the control unit 250 of the streamer 200 detects the random access indicator contained in a transport stream packet header. If a random access indicator is detected, previously received transport stream packets and the transport stream packet having the random access indicator are grouped into a stream object unit (SOBU). Likewise, transport stream packets received after the transport stream packet having the random access indicator and a transport stream packet having the next random access indicator are grouped into another stream object unit (SOBU). In this manner, the received data stream is recorded on the recording medium as a series of stream object units (SOBU 1~SOBU q) as shown in FIG. 3. A stream object unit presentation time (SOBU_TM) and a stream object unit size (SOBU_SZ) are created for each stream object unit (SOBU) and recorded as management information pertaining to the associated stream object unit, where the stream object unit size (SOBU_SZ) is expressed in terms of the number of sectors in which the associated stream object unit (SOBU) is recorded.

If a predetermined number, for example 20, of stream object units (SOBUs) are created by repeating the grouping task, the control unit 250 creates and records a stream object unit index number (SOBU_N), an accumulated presentation time (ACC_TM), and an accumulated size (ACC_SZ) for the 20 stream object units. The accumulated presentation time (ACC_TM) and accumulated size (ACC_SZ) for each of 20 stream object units are the presentation time and size accumulated from the start position (SOB2_OFF_ADDR) of the stream object (SOB2) containing the associated stream object units to each of 20 stream object units, respectively.

After the recording mode ends, the control unit 250 of the streamer 200 groups the created stream object units (SOBUs) into a stream object (SOB) and groups the recorded accumulated sizes (ACC_SZs) and stream object unit sizes (SOBU_SZs) into a map. The map is stored in the management information area of a memory 260 as stream object information (SOBI).

Subsequently, the control unit 250 of the streamer 200 creates a presentation sequence information (Cell) concerning the map and stores the cell as the presentation sequence information corresponding to the created record (RCD) or program (PG) in the management information area of the memory 260.

The method for a time search operation by a user will now be explained by assuming that digital data streams are recorded on the recording medium by the aforementioned method.

If a user enters a search time (HH:MM:SS:FF) in order to search for a specific position on the recording medium 230, the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, . . . , Cn_S_TM) and presentation end time (C1_E_TM, C2_E_TM, . . . , Cn_E_TM) of each Cell contained in the detected program PG2.

Referring to the stream object information (SOBI) of the stream object SOB2 associated with the detected presentation sequence information Cell 2, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM). Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry).

The control unit 250 controls a stream reproducing unit 240 to reproduce transport stream packets from the first sector (Sector 1) in which the detected target stream object unit (SOBUg shown in FIG. 3) is recorded and transmit the reproduced transport stream packets to the set top box 100 through the IEEE-1394 interface. The decoding operation, therefore, is performed from the transport stream packet having a random access indicator, which means video data is reproduced from the Intra-picture and audio data is reproduced from the first bye of a frame.

Figure 4B:
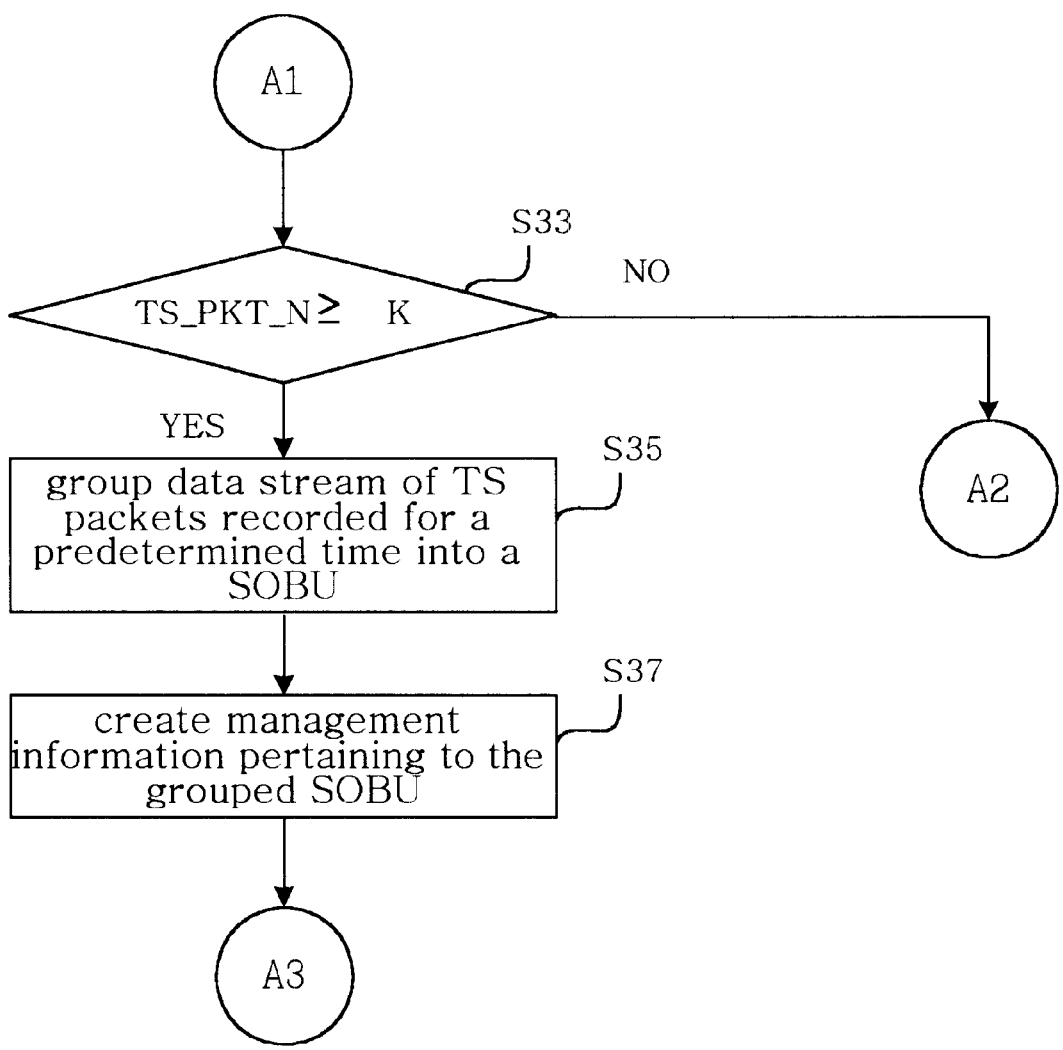

The method for recording digital data streams in accordance with another embodiment of the present invention will be described with reference to the flow diagrams shown in FIGS. 4A and 4B.

If a user's request for recording an incoming data stream tuned by the tuning unit 110 has been received, the control unit 140 of the set top box 100 informs the control unit 250 of the streamer 200 that a recording mode is set and begins to transfer the received digital stream to the streamer 200 through the IEEE-1394 interface (S11).

The control unit 250 of the streamer 200 controls the stream recording unit 220 to record the data stream received through the IEEE-1394 interface on the recording medium 230 (S13). The transport stream packets (TS Pkt 1~TS Pkt k) constituting the data stream are recorded on the recording medium 230 along with respective transport stream packet arrival times (TS APATs), wherein the transport stream packets with packet arrival times are organized in sectors on the recording medium 230.

Subsequently, the control unit 250 resets an internal register for storing the number of transport stream packets (TS_Pkt_N) to zero (S15) and searches for a random access indicator in the header of the first transport stream packet of the input data stream (S17). And the control unit 250 increments the internal register value indicative of the number of transport stream packets (TS_Pkt_N) by 1 (S19) and checks if a random access indicator has been discovered in step S17 (S21).

In the instance where the existence of a random access indicator is confirmed in step S21, the transport stream packets received up to the transport stream packet having the random access indicator are grouped into a stream object unit (SOBU) as performed in the previous embodiment (S23). Likewise, transport stream packets received after the transport stream packet having the random access indicator and the transport stream packet having the next random access indicator are grouped into another stream object unit (SOBU).

If a stream object unit is created, the control unit 250 creates a stream object unit presentation time (SOBU_TM) and a stream object unit size (SOBU_SZ) for the stream object unit (SOBU) and stores them in the management information area of the memory 260 as management information regarding the stream object unit (SOBU).

The control unit 250 checks whether a request for terminating the recording mode has been received (S27) during the recording mode. If it is not received, the control unit 250 continues to searches for a random access indicator in the input data stream and initializes the number of transport stream packets (TS_Pkt_N) (S29). And the flow returns to step S19.

If the terminating command is received, the control unit 250 reads the management information stored in the management information area of the memory 260 and records the information in the management information area of the recording medium 230 before terminating the recording mode (S31). After the recording mode ends, the control unit 250 of the streamer 200 groups the created stream object units (SOBUs) into a stream object (SOB), and groups the recorded accumulated sizes (ACC_SZs), which have been generated during the recording mode as in the aforementioned embodiment, and stream object unit sizes (SOBU_SZs) into a map. The map is stored in the management information area of the memory 260 as stream object information (SOBI). In addition, the control unit 250 also creates a presentation sequence information for the grouped stream object and records it as a cell information for the stream object.

Additionally, the control unit 250 sets the value of a stream object unit grouping type indication flag contained in the stream object information (SOBI) to 1 for indicating that stream object units constituting the stream object are created based upon the random access indicator.

The value of the stream object unit grouping type indication flag implies that the stream object unit (SOBU) is created so that it is randomly accessible and thus the stream object unit (SOBU) is the basic group for a trick-play which means data-discrete reproduction. This fact also means that the stream object unit (SOBU) contains a random access entry point.

Stream object units can be created in a different way. For example, it is possible to generate stream object units of a predetermined size without regard to the random access indicator. If a random access indicator is detected from a stream object unit, a flag indicative of the fact can be set to 1 for the stream object unit (SOBU) and recorded on the recording medium.

To be more specific, an n-bit data is created for a stream object including n stream object units (SOBU1~SOBUn) and each bit of the data is associated with each stream object unit. Then, it can be examined whether a stream object unit (SOBU) has a random access indicator by simply checking the associated bit value.

In the meantime, if it is verified that a random access indicator is not discovered in step S21, the control unit 250 checks if the number of transport stream packets (TS_PKT_N) stored in the internal register is greater than a predetermined value K (S33). If not, the flow returns to step S17 and continues the aforementioned procedure.

The value K is determined in consideration of the minimum transfer rate of a data stream. For example, suppose that the desirable minimum time length of a stream object unit (SOBU) is 0.5 s and the minimum transfer rate of an input data stream is 3 Mbps. In this case, the size of data received for 0.5 s exceeds 1875000 bytes and more than 997 transport stream packets are received for 0.5 s with each transport stream packet having 188 bytes. Considering the number of transport stream packets received for 0.5 s, it is desirable to set the value K greater than 997. It is because at least one packet among 997 transport stream packets should have a random access indicator if the data stream is supposed to contain random access indicators.

If the number of transport stream packets (TS_PKT_N) stored in the internal register is greater than the predetermined value K in step S33, the control unit 250 decides that random access indicators were not inserted into the data stream when the data stream was transmitted by the associated broadcast station. The flow continues to step S35.

With reference to time information contained in the transport stream packets, the control unit 250 records the received transport stream packets by grouping them into stream object units, with each stream object unit (SOBU) having a fixed time length, for example, 0.5 s (S35). Also, the control unit 250 creates a stream object unit size (SOBU_SZ) and a stream object unit presentation time (SOBU_TM) for each stream object unit (SOBU) and records the created information as management information for the associated stream object unit (SOBU) (S37). The stream object unit size (SOBU_SZ) of a stream object unit (SOBU) is expressed in terms of the number of sectors containing the stream object unit. If 20 stream object units (SOBUs) are created after 10 s elapses, the control unit 250 creates and records a stream object unit index number (SOBU_N), an accumulated presentation time (ACC_TM), and an accumulated size (ACC_SZ) for each stream object unit (SOBU). The accumulated presentation time (ACC_TM) and accumulated size (ACC_SZ) of a stream object unit are the presentation time and size accumulated from the start position (SOB2_OFF_ADDR) of the stream object (SOB2) containing the stream object unit to the stream object unit, respectively. After the recording mode ends, the control unit 250 groups the created stream object units (SOBUs) into a stream object (SOB) and groups the recorded accumulated sizes (ACC_SZs) and stream object unit sizes (SOBU_SZs) into a map. The map is stored in the management information area of the memory 260 as stream object information (SOBI).

At this time, the control unit 250 sets the stream object unit grouping type indication flag contained in the stream object information (SOBI) to zero to inform that stream object units (SOBUs) constituting the stream object (SOB) have not been generated based upon random access indicators but generated based upon time.

Subsequently, the control unit 250 of the streamer 200 creates a presentation sequence information (Cell) concerning the map and stores it in the management information area of the memory 260 as the presentation sequence information corresponding to the record (RCD) or program (PG) which has been created by a single recording operation.

The control unit 250 checks whether a request for terminating the recording mode has been received (S39). If so, the flow branches to step S31 wherein the management information stored in the management information area of the memory 260 are recorded in the management information area of the recording medium 230 and the recording mode terminates. If not, the flow returns to step S35 to the aforementioned recording procedure.

Figure 5:
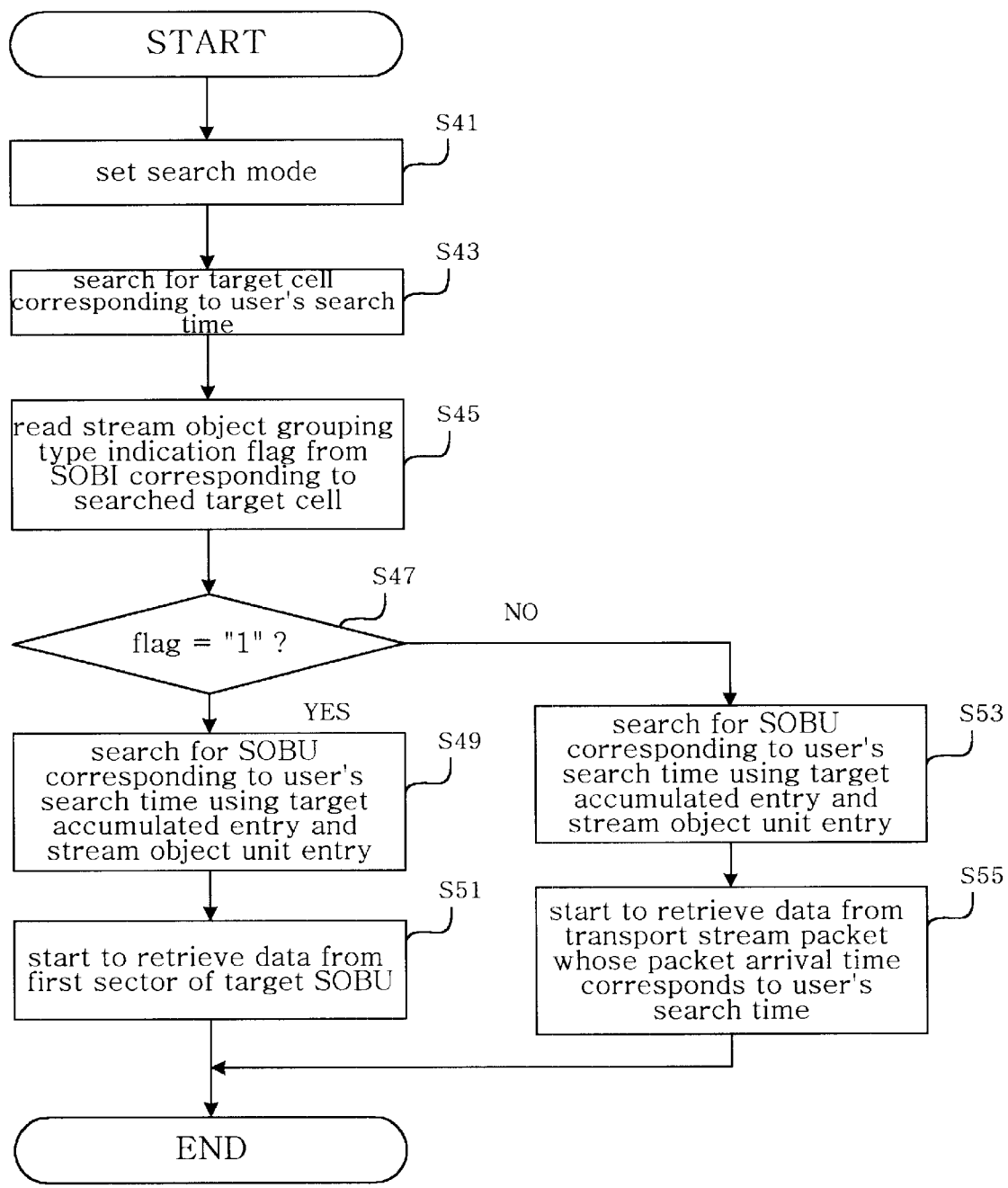
FIG. 5 is a flow diagram of the method for searching a digital data stream recorded by another embodiment of the present invention.

If a user sets a time search mode in order to search for specific data recorded on the recording medium by the above-mentioned method described with reference to FIGS. 4A and 4B, the search operation begins. Detailed explanation about the search operation will be given below with reference to FIGS. 3 and 5.

If a user enters a search time (HH:MM:SS:FF) in order to search for a specific position on the recording medium 230 (S41), the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, . . . , Cn_S_TM) and presentation end time (C1_E_TM, C2_E_TM, . . . , Cn_E_TM) of each Cell contained in the detected program PG2 (S43).

Next, the control unit 250 reads stream object unit grouping type indication flag from the stream object information (SOBI) of the stream object SOB 2 corresponding to the detected Cell 2 (S45) and checks if the flag is 1 (S47). The value "1" indicates that stream object units constituting the stream object SOB 2 have been created based on random access indicators (S47).

If it is confirmed in step S47 that the flat is 1, the control unit 250 searches for a stream object unit (SOBUg in FIG. 3) corresponding to the user's search time as explained with reference to FIG. 3 (S49) and controls the stream reproducing unit 240 so that reproduction of recorded data begins from the packets located in the first sector (Sector 1) containing the stream object unit SOBUg and the retrieved data can be transferred to the set top box 100 through the IEEE-1394 interface 210 (S51).

If it is confirmed in step S47 that the flag is not 1, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM) with reference to the stream object information (SOBI) of the stream object SOB2 associated with the detected presentation sequence information Cell 2. Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry) (S53).

As a next step, the control unit 250 detects the transport stream packet arrival time (TS APAT) of each transport stream packet from the first sector Sector 1 containing the detected stream object unit SOBUg and compares the packet arrival time with the user's search time (HH:MM:SS:FF). The control unit 250 starts to retrieve recorded data from the transport stream packet whose packet arrival time is after the user's search time and controls the stream reproducing unit 240 so that the retrieved data can be transferred to the set top box 100 through the IEEE-1394 interface 210 (S55).

The invention may be embodied in other specific forms. For example, the invention is not only applicable to the apparatus shown in FIG. 1 but applicable to any system including a subsystem functioning as a set top box, another subsystem functioning as streamer, and a communication interface between the two systems.

In the previous embodiments, the random access indicators contained in the received data stream were detected by the control unit of the streamer. It is also possible, however, for the control unit of the set top box to detect the random access indicators and transmit the detected random access indicators to the streamer through the IEEE-1394 interface. In this case, the control unit of the set top box detects random access indication information for each transport stream packet and adds a flag indicative of the existence of the random access indication information during time stamping of the associated transport stream packet. The control unit of the streamer checks the flag and determines the method for creating stream object units depending on the flag value.

According to the present invention, random access information contained in a received digital data streams is detected and stream object units are created based upon the detected random access information, which enables reproduction of recorded data to start from the transport stream packet having the random access information and prevents imperfect data reproduction after track seek or time seek operations.

Also, the received digital data stream is recorded on a recording medium by partitioning the received data stream into random-accessible minimum presentation units or presentation units of a fixed time length depending upon the existence of random access indication information, thereby not limiting the usage of the apparatus.

The invention may be embodied in other specific forms without departing from the spirit or essential characteristics thereof. The present embodiments are therefore to be considered in all respects. as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording digital data streams to a recording medium, including the steps of:

(a) checking the existence of presentation entry point information for data discrete reproduction in a received digital transport'stream of digital transport stream units, the presentation entry point information having been selectively inserted into the digital transport stream;

(b) creating and recording information regarding the location of data section based upon the checked result the data section being separated by the presentation entry point information; and (c) creating and recording indication information for a stream object containing groups of transport stream units, the indication information indicating whether the information regarding the location of data sections, separated by the presentation entry point information exists or not.

2. A method set forth in claim 1, wherein the presentation entry point information indicates that the received transport stream units include intra-coded data.

3. A method set forth in claim 1, wherein said step (a) checks the existence of random access indication information by decoding the received transport stream units.

4. A method set forth in claim 1, wherein said step (a) checks the existence of random access indication information which an external data receiving unit provides as a characteristic of the transport stream by decoding the transport stream units.

5. A method set forth in claim 1, wherein the information regarding the location of data sections is created based upon arrival times of each transport stream units.

6. A method for recording digital data streams to a recording medium, including the steps of:

(a) recording a received digital transport stream of digital transport stream units by grouping the digital transport stream units into stream object units; and (b) creating and recording information indicating whether presentation entry point information for data discrete reproduction is included in the created stream object units or not.

7. A method set forth in claim 6, wherein the indicating information is indicative of the way the stream object units are separated into a group.

8. A method set forth in claim 6, whether said step (a) further includes the step of creating and recording information on the accumulated size and accumulated time of stream object units recorded until the number of created stream object units reaches a predetermined value.

9. A method set forth in claim 6, further including the step of creating and recording information on the size of each group of stream object units.

10. A method for reproducing digital data streams from a recording medium, including the steps of:

detecting indication information associated with each stream object, the indication information indicating whether information regarding the location of data sections separated based upon presentation entry point information exists or not;

retrieving the information regarding the location of data sections based upon the detected indication information; and determining the data reproduction start position on the recording medium based upon the retrieved information regarding location of data sections.

11. A method set forth in claim 10, wherein the indication information is indicative of the way the stream object units are separated into a group.

12. An apparatus for recording digital data streams to a recording medium, including:

receiving means for receiving a digital transport stream of digital transport stream units;

recording means for recording the received digital transport stream on a recording medium;

detection means for detecting presentation entry point information for data discrete reproduction, the presentation entry point information having being selectively inserted into the received digital transport stream; and control means for creating information on the location of data sections separated based upon the presentation entry point information, controlling said recording means to record the created location information, creating indication information indicating the existence of the information on the location of data sections, and controlling said recording means to record the created indication information, wherein the indication information is created for each stream object unit containing digital transport stream units recorded.

13. An apparatus set forth in claim 12, wherein the presentation entry point information indicates that the received transport stream units include intra-coded data.

14. An apparatus for recording digital data streams to a recording medium, including:

receiving means for receiving a digital transport stream of digital transport stream units;

recording means for recording the received digital transport stream on a recording medium by grouping the digital transport stream units into stream object units; and control means for creating indication information indicating whether or not presentation entry point information for data discrete reproduction is included in the grouped stream object units and controlling said recording means to record the indication information.

15. An apparatus for reproducing digital data streams from a recording medium, including the steps of:

reproducing means for reproducing digital data recorded on a recording medium;

detection means for detecting indication information associated with each stream object from the digital data reproduced by said reproducing means, the indication information indicating whether information regarding the location of data sections separated based upon presentation entry point information exists or not; and control means for retrieving the information regarding the location of data sections depending upon the detected indication information and determining the data reproduction position of said reproducing means based upon the retrieved location information.

16. An apparatus for recording digital data streams to a recording medium, including:

a data receiver to receive a digital transport stream of digital transport stream units;

a pickup to recording the digital transport stream received from said data receiver on a recording medium;

a entry data detector to detect presentation entry point information for data discrete reproduction, the presentation entry point information having being selectively inserted into the digital transport stream received from said data receiver; and a controller to create information on the location of data sections separated based upon the presentation entry point information detected by said entry data detector, to control said pickup to record the created location information, to create indication information indicating the existence of the information on the location of data sections recorded by said pickup, and to control said pickup to record the created indication information, wherein the indication information is created for each stream object unit containing digital transport stream units recorded.

17. An apparatus for recording digital data streams to a recording medium, including:

a data receiver to receive a digital transport stream of digital transport stream units;

a data recorder to record the digital transport stream received from said data receiver on a recording medium by grouping the digital transport stream units into stream object units; and a controller to create indication information indicating whether or not presentation entry point information for data discrete reproduction is included in the stream object units recorded and grouped by said data recorder, and to control said data recorder to record the indication information.

18. An apparatus for reproducing digital data streams from a recording medium, including the steps of:

a pickup to reproduce digital data recorded on a recording medium;

a management data detector to detect indication information associated with each stream object from the digital data reproduced by said pickup, the indication information indicating whether information regarding the location of data sections separated based upon presentation entry point information exists or not; and a controller to retrieve the information regarding the location of data sections depending upon the indication information detected by said management data detector, and to determine the data reproduction position of said pickup based upon the retrieved location information.

* * * * *